(12) United States Patent
Li et al.

(10) Patent No.: US 9,784,104 B2
(45) Date of Patent: Oct. 10, 2017

(54) ENGINE CAPABLE OF REDUCING NOISE

(71) Applicant: Kwang Yang Motor Co., Ltd., Kaohsiung (TW)

(72) Inventors: Wei-Chung Li, Kaohsiung (TW); Wen-Tso Cheng, Kaohsiung (TW); Sai-Dai Yang, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 416 days.

(21) Appl. No.: 14/602,622

(22) Filed: Jan. 22, 2015

(65) Prior Publication Data

US 2015/0211369 A1    Jul. 30, 2015

(30) Foreign Application Priority Data

Jan. 29, 2014  (TW) .............................. 103103548 A

(51) Int. Cl.
| | |
|---|---|
| *F01B 9/02* | (2006.01) |
| *F01P 5/12* | (2006.01) |
| *F01B 31/00* | (2006.01) |
| *F16F 15/26* | (2006.01) |
| *F16F 15/28* | (2006.01) |
| *F01B 23/10* | (2006.01) |

(52) U.S. Cl.
CPC ............... *F01B 9/02* (2013.01); *F01B 23/10* (2013.01); *F01B 31/005* (2013.01); *F01P 5/12* (2013.01); *F16F 15/264* (2013.01); *F16F 15/283* (2013.01)

(58) Field of Classification Search
CPC  F01B 9/02; F01B 23/10; F01B 31/005; F01P 5/12; F16F 15/264; F16F 15/28; F16F 15/283

See application file for complete search history.

(56) References Cited

U.S. PATENT DOCUMENTS

| 6,904,884 B2* | 6/2005 | Utsumi | ................... F02B 61/02 123/192.2 |
| 8,844,493 B2* | 9/2014 | Takano | ................... F01M 1/10 123/196 A |

\* cited by examiner

*Primary Examiner* — Logan Kraft
(74) *Attorney, Agent, or Firm* — Husch Blackwell LLP

(57) ABSTRACT

An engine includes a cylinder system, a driving system including a piston and a crankshaft, a power generating system and a cooling system. The power generating system is disposed on a side of the driving system and includes a generator and a counterweight. The generator includes a main body and a rotor pivotally disposed within the main body. The cooling system is disposed on an opposite side of the driving system and includes a first water pump in fluid communication with the cylinder system. An outline of the rotor is projected along the crankshaft to form a first projecting zone. Projections of the first water pump and the driving system along the crankshaft overlap the first projecting zone.

8 Claims, 5 Drawing Sheets

ENGINE CAPABLE OF REDUCING NOISE

CROSS-REFERENCE TO RELATED APPLICATION

This application claims priority of Taiwanese Patent Application No. 103103548, filed on Jan. 29, 2014, the entire disclosure of which is hereby incorporated by reference.

FIELD OF THE INVENTION

This invention relates to an engine, more particularly to an engine capable of reducing noise.

BACKGROUND OF THE INVENTION

Referring to FIG. 1, a conventional engine 1 includes a cylinder system 11, a piston 12 that is capable of moving upwardly and downwardly in the cylinder system 11, a crankshaft 13 that is driven by the piston 12, a first gear 14 that is disposed on the crankshaft 13, a rotating shaft 15 that is parallel to and space-apart from the crankshaft 13, a second gear 16 that is disposed on the rotating shaft 15 and that meshes with the first gear 14, a water pump 17 that is driven by the rotating shaft 15, and a heat exchanger 18 that is in fluid communication with the water pump 17. When the engine 1 starts to operate, the piston 12 drives the crankshaft 13 along with the first gear 14 to rotate, and the first gear 14 drives the second gear 16 to rotate so as to drive rotation of the rotating shaft 15, thereby activating the water pump 17. The cooling water is transported by the water pump 17 to dissipate the heat generated from the cylinder system 11. The cooling water that has been heated up by the cylinder system 11 is then transported through the water pump 17 into the heat exchanger 18 so as to be cooled down again and reflow into the cylinder system 11 to achieve another cooling cycle.

FIG. 2 is a chart showing a curve of the rotational speed of the crankshaft 13 versus time. FIG. 3 is a chart showing a curve of rotational speed of the rotating shaft 15 versus time. Compare FIG. 2 with FIG. 3, when the rotational speed of the crankshaft 13 changes, the rotational speed of the rotating shaft 15 changes accordingly. However, since the water pump 17 is disposed on a side of the engine 1, the weight distribution is not uniform. Therefore, the rotational speed of the rotating shaft 15 is relatively unstable when the rotating speed of the crankshaft 13 changes, thereby increasing vibration and noise during operation of the engine and reducing the stability and the service life of the engine.

SUMMARY OF THE INVENTION

Therefore, the object of the present invention is to provide an engine that can overcome the aforesaid drawback of the prior art.

According to this invention, an engine includes a cylinder system, a driving system, a power generating system and a cooling system. The driving system is disposed under the cylinder system and includes a piston that is capable of moving upwardly and downwardly in the cylinder system and a crankshaft that is driven by the piston. The power generating system is disposed on a side of the driving system and includes a generator that is disposed on one end of the crankshaft and that is driven by the crankshaft, and a counterweight that is disposed on the crankshaft. The generator includes a main body and a rotor that is pivotally disposed within the main body and that is adjacent to the counterweight. The cooling system is disposed on an opposite side of the driving system and includes a first water pump that is in fluid communication with the cylinder system. An outline of the rotor is projected along an axis of the crankshaft to form a first projecting zone. The projected areas of the first water pump and the driving system along the axis of the crankshaft overlap are located almost wholly the first projecting zone.

BRIEF DESCRIPTION OF THE DRAWINGS

Other features and advantages of the present invention will become apparent in the following detailed description of the embodiment of this invention, with reference to the accompanying drawings, in which.

DETAILED DESCRIPTION OF THE EMBODIMENT

An engine according to the present invention is adapted to be used in a two-wheel or four-wheel vehicle, such as a motorcycle or an all terrain vehicle.

Figure 4:
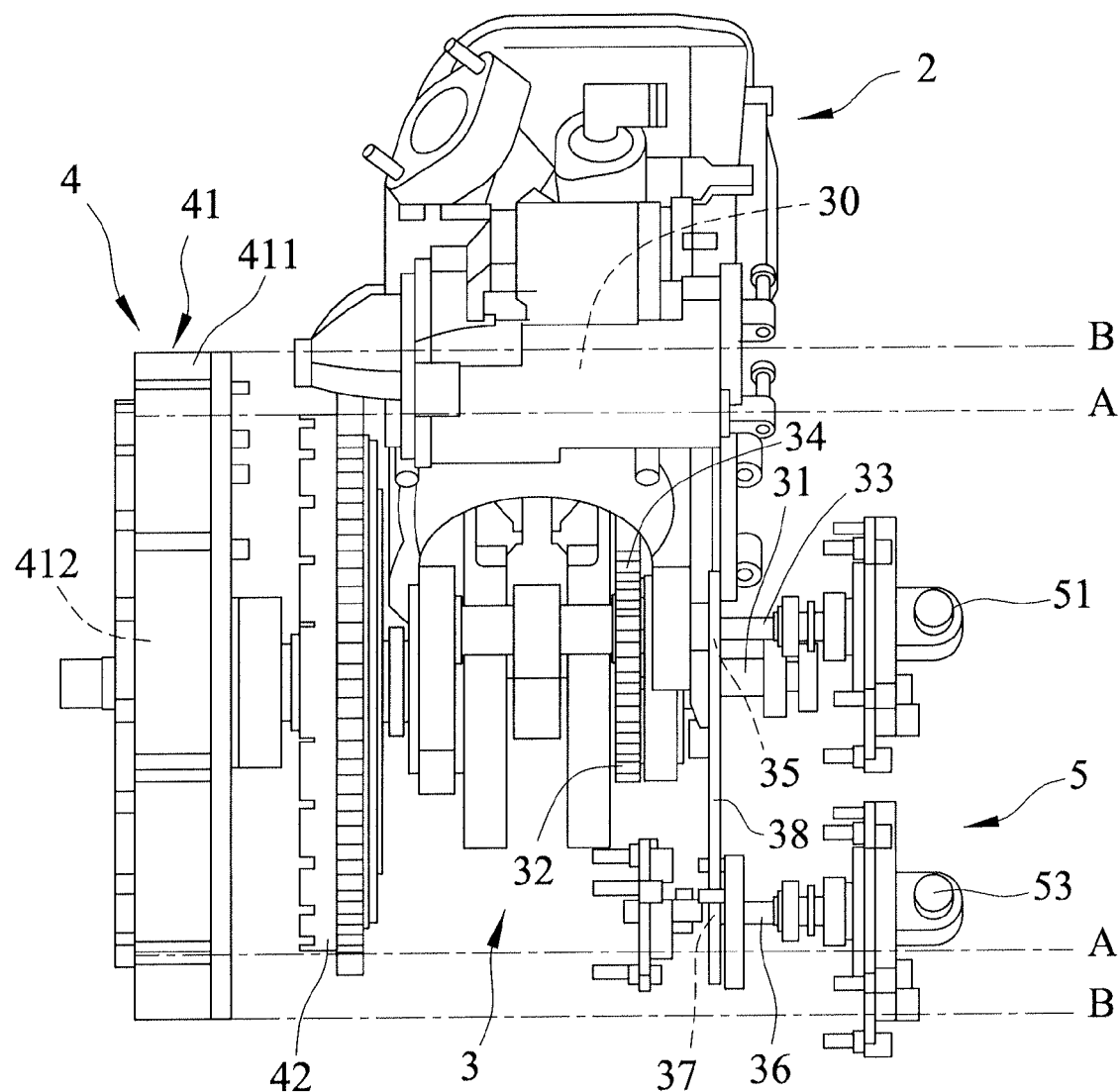
FIG. 4 is a schematic view of the embodiment of an engine according to this invention.
Figure 5:
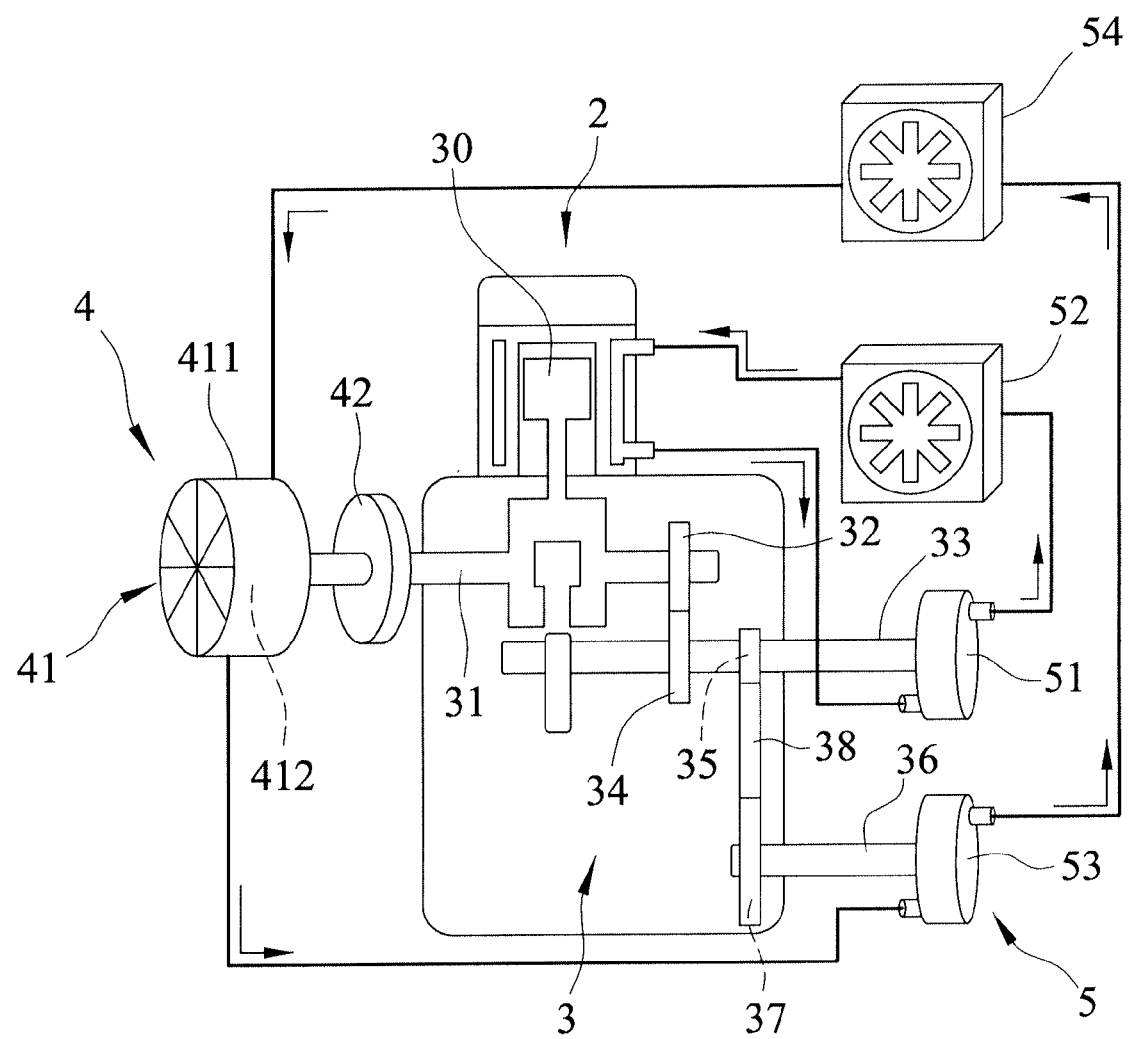
FIG. 5 is a schematic view of the embodiment.

Referring to FIGS. 4 and 5, the embodiment of an engine according to the present invention includes a cylinder system 2, a driving system 3, a power generating system 4 and a cooling system 5.

The driving system 3 is disposed under the cylinder system 2 and includes a piston 30 that is capable of moving upwardly and downwardly in the cylinder system 2, a crankshaft 31 that is driven by the piston 30, a first gear 32 that is disposed on the crankshaft 31, a balancing shaft 33 that is parallel to and space-apart from the crankshaft 31, a second gear 34 that is disposed on the balancing shaft 33 and that meshes with the first gear 32, a third gear 35 that is disposed on the balancing shaft 33 and that is spaced-apart from the second gear 34, a rotating shaft 36 that is parallel to and space-apart from the balancing shaft 33, a fourth gear 37 that is disposed on the rotating shaft 36, and a transmissive unit 38 that is belt-shaped and that surrounds and meshes with the third and fourth gears 35, 37. In this embodiment, at least one of the first gear 32 and the second gear 34 is a damping gear. Examples of the transmissive unit 38 are a chain and a belt having a plurality of teeth. However, the transmissive unit 38 is not limited thereto and may vary based on actual requirements.

The power generating system 4 is disposed on a side of the driving system 3 and includes a generator 41 that is disposed on one end of the crankshaft 31 and that is driven by the crankshaft 31, and a counterweight 42 that is disposed on the crankshaft 31. The generator 41 includes a main body 411 and a rotor 412. The rotor 412 is pivotally disposed within the main body 411, is adjacent to the counterweight 42 and has a diameter that is the same as that of the counterweight 42. The counterweight 42 is for example but not limited to a flywheel.

An outline of the rotor 412 is projected along an axis of the crankshaft 31 to form a first projecting zone (A). An outline of the main body 411 is projected along the axis of the crankshaft 31 to form a second projecting zone (B). It should be noted that a projected area of the driving system 3 along the axis of the crankshaft 31 overlaps the first projecting zone (A).

The cooling system 5 is disposed on an opposite side of the driving system 3 distal from the power generating system 4 and includes a first water pump 51 that is in fluid communication with the cylinder system 2 and that is driven by the balancing shaft 33, a first heat exchanger 52 that is in fluid communication with the first water pump 51 and the cylinder system 2, a second water pump 53 that is in fluid communication with the generator 41 and that is driven by the rotating shaft 36, and a second heat exchanger 54 that is in fluid communication with the second water pump 53 and the generator 41. A projected area of the first water pump 51 along the axis of the crankshaft 31 is located in the first projecting zone (A). A projected area of the second water pump 53 along the axis of the crankshaft 31 is located in the second projecting zone (B) and is partly located outside the first projecting zone (A).

The power generating system 4 has a working temperature lower than that of the air cylinder system 2. Therefore, the power generating system 4 requires lower cooling efficiency than that of the cylinder system 2. By adjusting the rotational speed ratio among the first to fourth gears 32, 34, 35 37, the rotational speed of the first water pump 51 and the rotational speed of the second water pump 53 generate different cooling efficiencies to respectively cool down the cylinder system 2 and the power generating system 4. In this embodiment, the tooth number of the first gear 32 is the same as that of the second gear 34, and the tooth number of the third gear 35 is less than that of the fourth gear 37. In this configuration, the first water pump 51 has a rotational speed greater than that of the second water pump 53 so that the air cylinder system 2 has a cooling efficiency higher than the power generating system 4.

Figure 1:
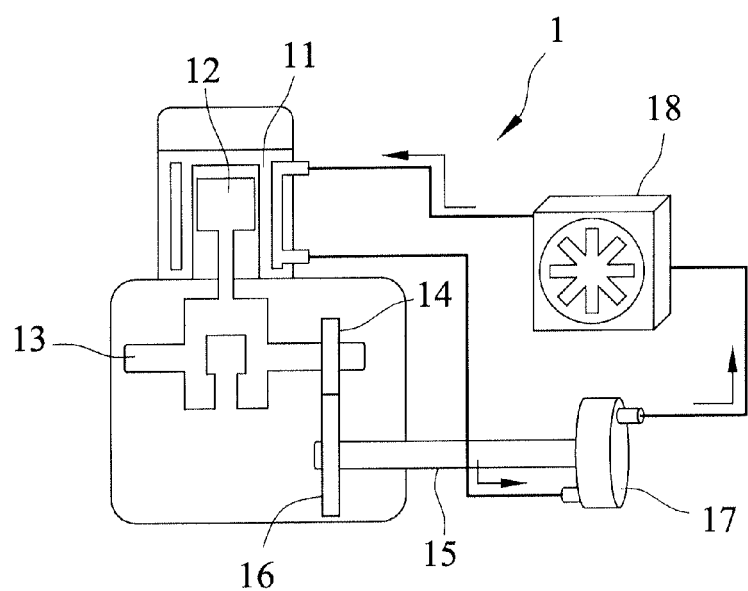
FIG. 1 is a schematic view of a conventional engine.
Figure 2:
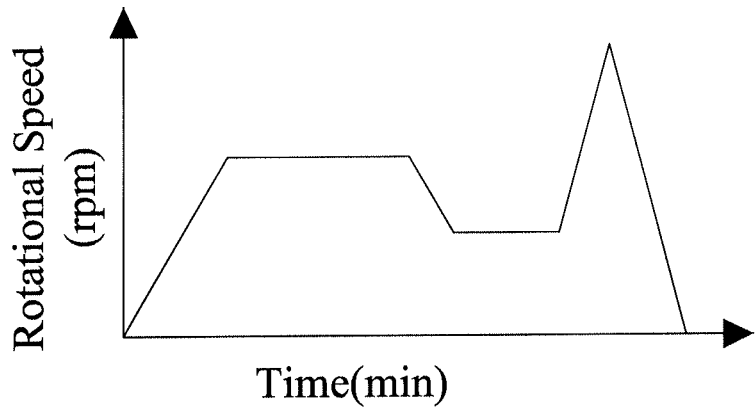
FIG. 2 is a chart showing a curve of the rotational speed of a crankshaft of the conventional engine versus time.
Figure 3:
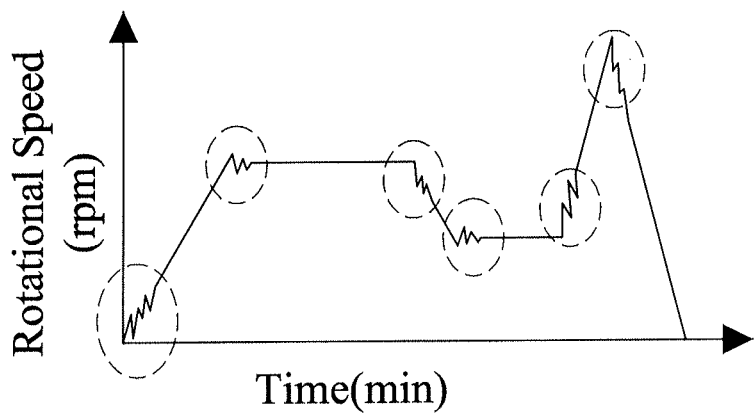
FIG. 3 is a chart showing a curve of the rotational speed of a rotating shaft of the conventional engine versus time.
Figure 6:
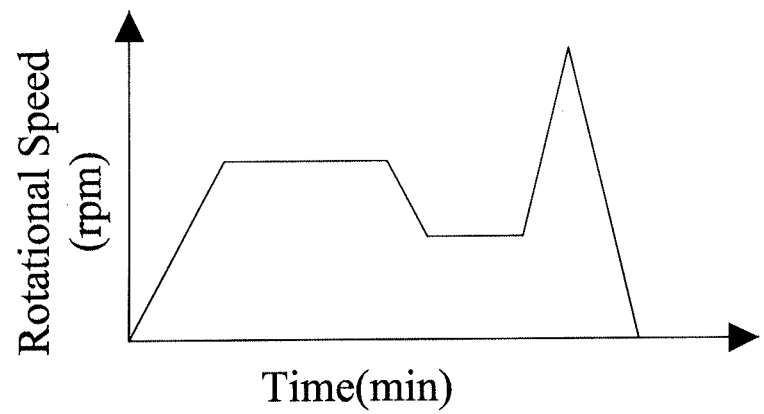
FIG. 6 is a chart showing a curve of the rotational speed of a crankshaft of the embodiment versus time.
Figure 7:
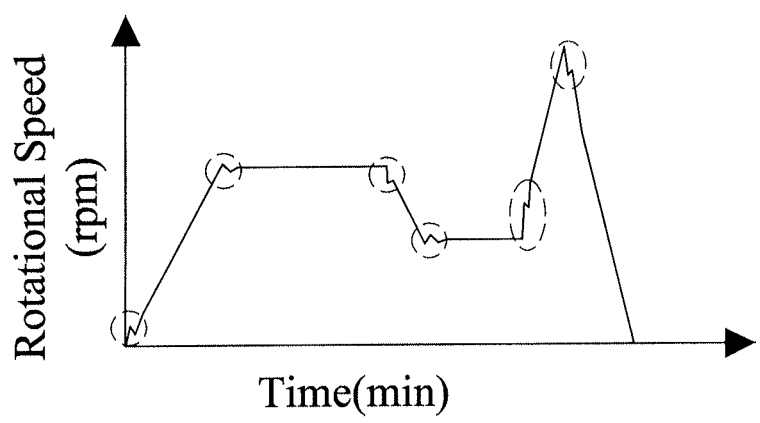
FIG. 7 is a chart showing a curve of the rotational speed of a rotating shaft of the embodiment versus time.

FIG. 6 is a chart showing a curve of the rotational speed of the crankshaft 31 versus time according to this invention. FIG. 7 is a chart showing a curve of the rotational speed of the rotating shaft 36 versus time according to this invention. Compare FIG. 6 with FIG. 7, when the rotational speed of the crankshaft 31 changes, the rotational speed of the rotating shaft 36 changes accordingly. Further compare FIG. 7 with FIG. 3, the unstable vibration encountered by the rotating shaft 36 of the engine is reduced.

Referring to FIGS. 4 and 5, since at least one of the first gear 32 and the second gear 34 is a damping gear, and the transmissive unit 38 is used to drive the third gear 35 and the fourth gear 37, noise and vibration of gears can be reduced. Moreover, the presence of the balancing shaft 33 disposed between the crankshaft 31 and the rotating shaft 36 results in a reduction in the vibration of the crankshaft 31. The cooling water pumped by the first water pump 51 can also absorb the vibration between gears. Furthermore, the orientation of the rotor 412 and the counterweight 42 can also reduce the noise and vibration. By disposing the driving system 3 in such a manner that its projected area along the axis of the crankshaft 31 overlaps the first projecting zone (a), the rotor 412 can cooperate with the counterweight 42 and the driving system 3 to achieve a maximum reduction of the vibration. Moreover, such an arrangement is very compact, thereby reducing the space occupied by the driving system 3.

While the present invention has been described in connection with what is considered the most practical embodiment, it is understood that this invention is not limited to the disclosed embodiment but is intended to cover various arrangements included within the spirit and scope of the broadest interpretation and equivalent arrangements.

What is claimed is:

1. An engine, comprising:
   a cylinder system;
   a driving system disposed under said cylinder system and including a piston that is capable of moving upwardly and downwardly in said cylinder system and a crankshaft that is driven by said piston;
   a power generating system disposed on a side of said driving system and including a generator that is disposed on one end of said crankshaft and that is driven by said crankshaft, and a counterweight that is disposed on said crankshaft, said generator including a main body and a rotor that is pivotally disposed within said main body and that is adjacent to said counterweight; and
   a cooling system disposed on an opposite side of said driving system and including a first water pump that is in fluid communication with said cylinder system;
   wherein an outline of said rotor is projected along an axis of said crankshaft to form a first projecting zone, projected areas of said first water pump and said driving system along the axis of said crankshaft overlapping the first projecting zone; and
   wherein an outline of said main body of said generator is projected along the axis of said crankshaft to form a second projecting zone, said cooling system further including a second water pump that is in fluid communication with said generator, a projected area of said second water pump along the axis of said crankshaft being located in the second projecting zone.

2. The engine as claimed in claim 1, wherein said cooling system further includes a first heat exchanger4 that is in fluid communication with said first water pump and said cylinder system, and a second heat exchanger that is in fluid communication with said second water pump and said generator.

3. The engine as claimed in claim 2, wherein said driving system further includes a first gear that is disposed on said crankshaft, a balancing shaft that is parallel to and space-apart from said crankshaft and that drives said first water pump, and a second gear that is disposed on said balancing shaft and that meshes with said first gear, at least one of said first gear and said second gear being a damping gear.

4. The engine as claimed in claim 3, wherein tooth number of said first gear is the same as that of said second gear.

5. The engine as claimed in claim 3, wherein said driving system further includes a third gear that is disposed on said balancing shaft and that is spaced-apart from said second gear, a rotating shaft that is parallel to and space-apart from said balancing shaft and that drives said second water pump, a fourth gear that is disposed on said rotating shaft, and a transmissive unit that is belt-shaped and that surrounds and meshes with said third and fourth gears.

6. The engine as claimed in claim 5, wherein tooth number of said third gear is less than that of said fourth gear.

7. The engine as claimed in claim 5, wherein said transmissive unit is a chain.

8. The engine as claimed in claim 5, wherein said transmissive unit is a belt having a plurality of teeth.

* * * * *